(12) United States Patent
Hanson

(10) Patent No.: US 6,948,507 B2
(45) Date of Patent: Sep. 27, 2005

(54) DECK SUPPORT FOR TABLE UMBRELLA

(76) Inventor: Thomas Hanson, 131 Valencia Dr., Brick, NJ (US) 08723

( * ) Notice: Subject to any disclaimer, the term of this patent is extended or adjusted under 35 U.S.C. 154(b) by 0 days.

(21) Appl. No.: 10/884,266

(22) Filed: Jul. 6, 2004

(65) Prior Publication Data

US 2005/0006555 A1 Jan. 13, 2005

Related U.S. Application Data

(60) Provisional application No. 60/486,110, filed on Jul. 11, 2003.

(51) Int. Cl.[7] ............................................. E04H 15/28
(52) U.S. Cl. ......................................... 135/98; 248/539
(58) Field of Search ................................ 248/511, 519, 248/534, 535, 539, 188.5; 135/98

(56) References Cited

U.S. PATENT DOCUMENTS

| | | | | |
|---|---|---|---|---|
| 3,712,652 A | * | 1/1973 | Uikema | 403/108 |
| 6,082,680 A | * | 7/2000 | Woodward et al. | 248/682 |
| 6,315,252 B1 | * | 11/2001 | Schultz | 248/160 |
| 2002/0185167 A1 | * | 12/2002 | Lin et al. | 135/16 |
| 2004/0129184 A1 | * | 7/2004 | Kraker | 108/50.12 |

* cited by examiner

Primary Examiner—Ramon O Ramirez
(74) Attorney, Agent, or Firm—Clifford G. Frayne

(57) ABSTRACT

A deck support member for locking engagement with an umbrella pole utilized in combination with a table so as to firmly secure the lower end of the umbrella pole, the support member having a cylindrical cross section slightly less than the inner diameter of the umbrella pole, the support member being closed at its upper end and open at its lower end with an annular deck engaging flange, the upper end having an aperture therethrough for receipt of a deck engaging securing means, there being disposed within the cylindrical support member, a biasing means having an aperture coincidental with the aperture in the closed end of the cylindrical support member, there being disposed on the biasing means, a locking finger cooperable with an aperture formed in the side wall of the cylindrical support means, the locking finger movable to a recessed position within the cylindrical support member by foot pressure or by pressure from the slidable receipt of the umbrella pole over the cylindrical support member, the locking finger extensible from the cylindrical support member when coincidental alignment is achieved with an aperture in the side wall of the umbrella pole.

8 Claims, 4 Drawing Sheets

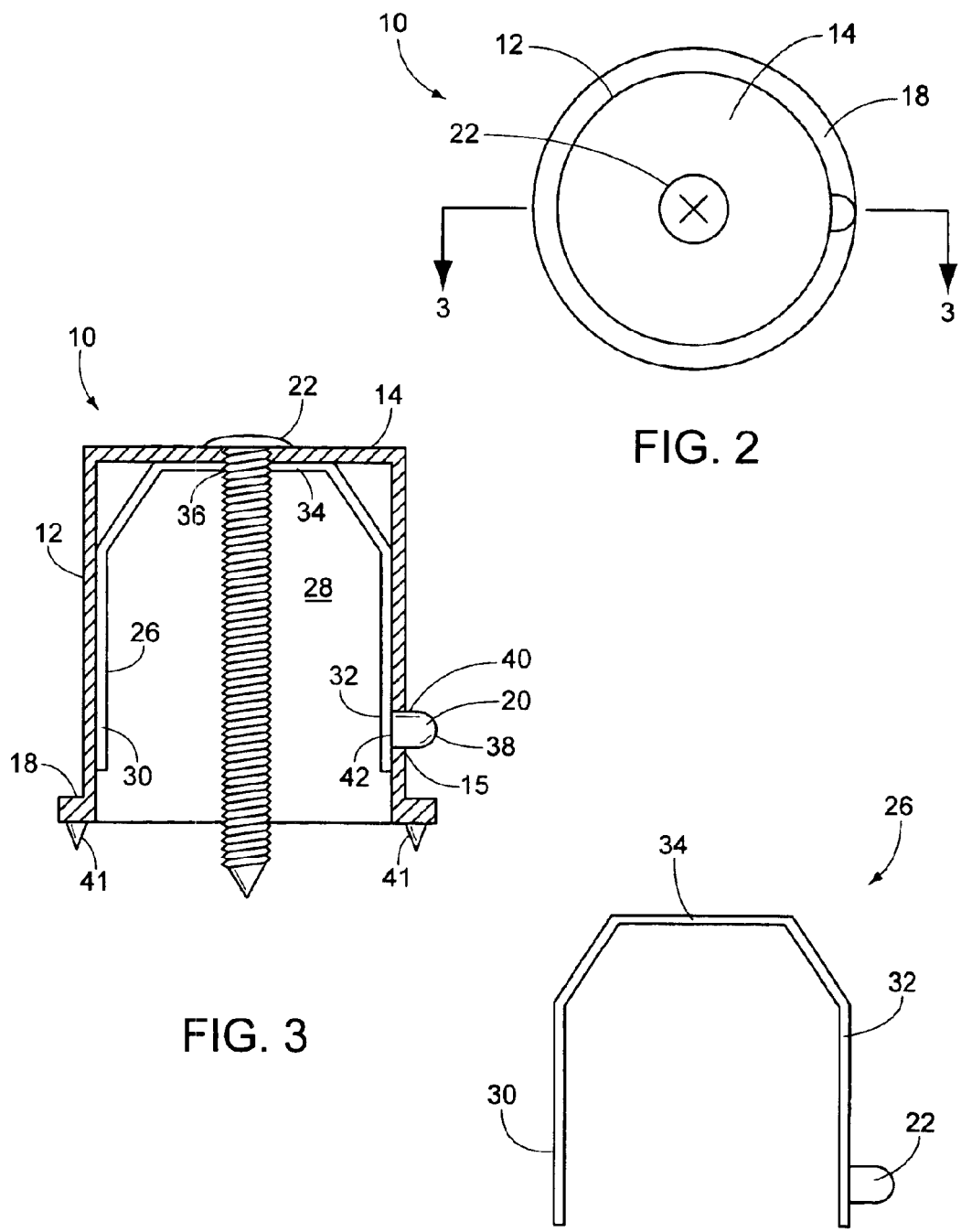

DECK SUPPORT FOR TABLE UMBRELLA

RELATED APPLICATIONS

Applicant claims the benefit of provisional application Ser. No. 60/486,110, filed Jul. 11, 2003.

BACKGROUND OF THE INVENTION

1. Field of the Invention

The present invention relates to a support for an umbrella pole most commonly associated with an umbrella utilized to shade a picnic table and is particularly adapted for use on a wooden deck.

2. Description of the Prior Art

Picnic table umbrellas are well known in the art. They are used to shade an outdoor picnic table while eating or entertaining. Typically the picnic table is formed with an aperture in its table top through which the pole of the umbrella is inserted. The lower end of the umbrella pole is then inserted into a base member which is typically a hollow base made of plastic having a centrally disposed bore for receipt of the umbrella and a removable cap means positioned on the base member to allow the user to fill the base member with ballast, such as sand and/or water. Additionally, there may be associated with the base member a threaded friction fastener to engage the outer surface of the lower portion of the umbrella pole.

Installed in the foregoing manner, the homeowner can raise and lower the umbrella webbing so as to provide shade to the table top and surrounding seating or to protect the table top and surrounding seating from any precipitation which may occur. The problem with the prior art was that the base member utilized to stabilize the umbrella pole is often of a substantial diameter such that it decreases the amount of leg and foot room underneath the table for people seated there at. There therefore was a need to minimize the size of the base member providing support to the umbrella pole so as to maximize the space and comfort available to individuals seated at the table. Still further, the base members of the prior art being made of plastic were prone to wear and degradation through exposure to the elements, i.e. UV sunlight, cold, etc., and therefore did not have a substantial life expectancy. Applicant's novel base member has particular application to picnic tables with umbrellas which are positioned on a wooden deck, which further could be adapted to other types of firm support surfaces.

OBJECTS OF THE INVENTION

An object of the present invention is to provide for a novel umbrella support for particular use on wooden decks.

A still further object of the present invention is to provide for a novel umbrella support used with an umbrella and picnic table combination which maximizes the space available beneath the picnic table for legs and feet.

A still further object of the present invention is to provide for a novel umbrella support for use on a wooden deck in which the umbrella and umbrella pole can be released and removed without the necessity of crawling under the table.

A still further object of the present invention is for a novel umbrella pole support which engages the umbrella pole in a positive locking manner.

A still further object of the present invention is for a deck support which will add extended life to the support pole.

SUMMARY OF THE INVENTION

A deck support member for locking engagement with an umbrella pole utilized in combination with a table so as to firmly secure the lower end of the umbrella pole, the support member having a cylindrical cross section slightly less than the inner diameter of the umbrella pole, the support member being closed at its upper end and open at its lower end with an annular deck engaging flange, the upper end having an aperture therethrough for receipt of a deck engaging securing means, there being disposed within the cylindrical support member, a biasing means having an aperture coincidental with the aperture in the closed end of the cylindrical support member, there being disposed on the biasing means, a locking finger cooperable with an aperture formed in the side wall of the cylindrical support means, the locking finger movable to a recessed position within the cylindrical support member by foot pressure or by pressure from the slidable receipt of the umbrella pole over the cylindrical support member, the locking finger extensible from the cylindrical support member when coincidental alignment is achieved with an aperture in the side wall of the umbrella pole.

BRIEF DESCRIPTION OF THE DRAWINGS

These and other objects of the present invention will become apparent, particularly when taken in light of the following illustrations wherein:

FIG. 2 is a top view of the support member of the present invention;

FIG. 3 is a cross cut view along plane 3—3 of FIG. 2;

FIG. 4 is a side view of the biasing means positioned within the support member;

DETAILED DESCRIPTION OF THE INVENTION

Figure 1:
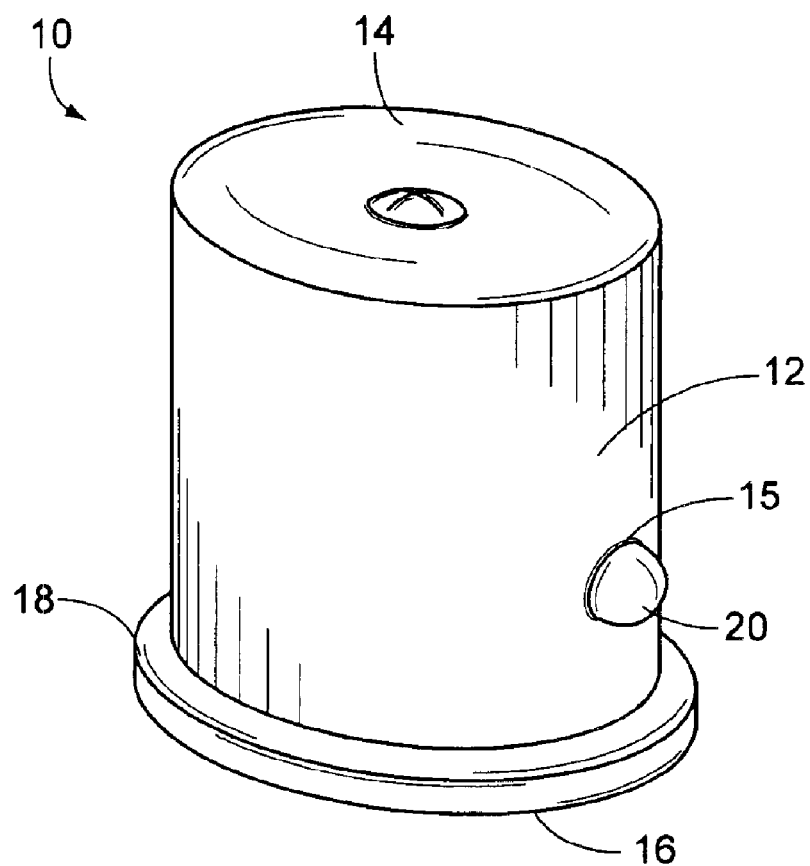
FIG. 1 is a perspective view of the support member of the present invention.

Deck support member 10, as illustrated in FIGS. 1 and 2, is cylindrical in shape having a circumferential side wall 12, and a closed top end 14. Lower end 16 is open and the cylindrical circumference 12 is formed with an annular flange 18. There is formed in the cylindrical side wall 12 of the support member 10, an aperture 15 for receipt of a locking reciprocal finger 20 as discussed hereafter. There is also formed in the closed top end 14 of the support member 10, an aperture 22 for accommodation of a threaded fastener 24 which would extend through aperture 22 and the interior of cylindrical support member 10 and engage the underlying support surface such as a wooden deck 60.

FIG. 3 is a cross sectional view along plane 3—3 of FIG. 2 of the assembled support member 10, and FIG. 4 is a side view of the biasing means 26 and reciprocating locking finger 20. The biasing means 26 is disposed or positioned within the cylindrical cavity 28 of cylindrical support member 10. The biasing means 26 in the embodiment illustrated consists of a U-shaped spring having a first leg 30, a second leg 32, and a cross leg 34. Cross leg 34 is formed with an aperture 36 therethrough alignable with the aperture 22 in the closed top end 14 of the cylindrical support member. Leg 32 of biasing means 26 is also fitted with a reciprocating locking finger 20 which extends outwardly from biasing means 26 and is dimensioned to be selectively reciprocated through aperture 15 on the cylindrical side wall 12 of the cylindrical support means 10. Reciprocating locking finger 20 has a full radius outer end 38 which merges into a cylindrical portion 40 having a rear face 42 which is secured to leg 32 of biasing means 26. Flange 18 may also be formed on its undersurface 16 with a plurality of depending teeth 41 so as to prevent support member 10 from rotating about its securing means.

The transformation from a full radius outer end 38 on locking finger 22 to a cylindrical body portion 40 is important in that when the locking finger 22 is extensible through aperture 15 on the support member 10, after the support member has slidably received the lower end of an umbrella pole, peripheral edge of the aperture 50 formed in the circumferential wall 56 of the umbrella pole 54 is actually engaged with the cylindrical body portion 40 of locking finger 22.

Figure 5:
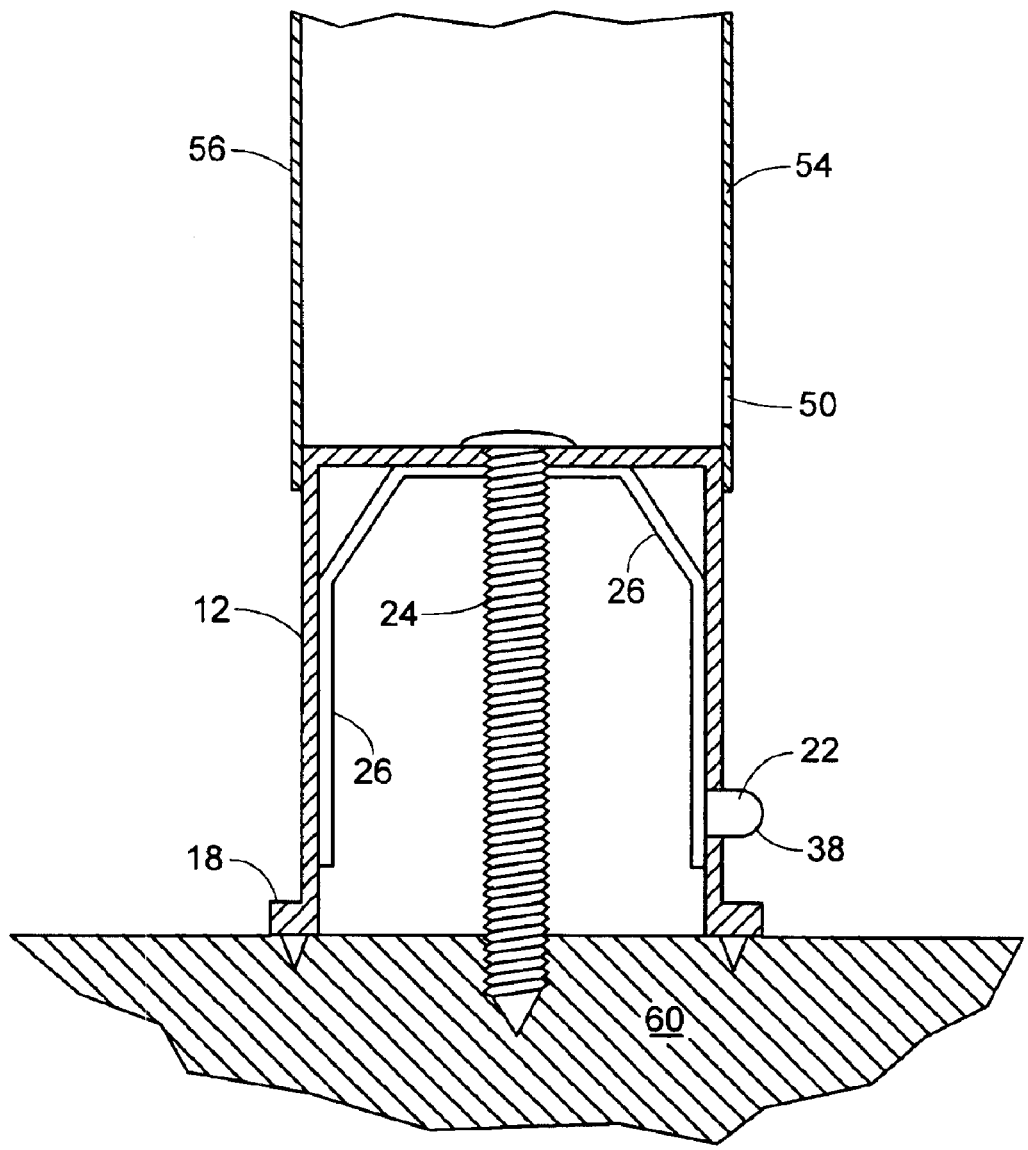
FIG. 5 is an exploded view of the support member 10 of the present invention with deck and umbrella pole.

FIG. 5 is an exploded side view of the support member 10 of the present invention installed on a wooden deck 60 with the lower portion of an umbrella pole 54 about to be slidably received thereon. For ease and convenience, the umbrella pole 54 would be lowered through the aperture in the table top of the picnic table and aligned with the support member 10 and slidably received thereon. The user would merely depress locking finger 22 slightly with his foot so as to recess the cylindrical body portion 40 of locking finger 22 within the support member 10. The circumferential wall 56 of the umbrella pole 54 would then further slidably engage and depress the full radius end 38 of the locking button permitting the umbrella pole 54 to slide completely over the support member 10. The umbrella pole could then be twisted slightly in order to align aperture 50 in the circumferential wall 56 of the umbrella pole 54 with the reciprocating locking finger 22 such that locking finger 22 through bias means 26 would move outwardly through the aperture 50 in the circumferential wall 52 of the umbrella pole 54 and lockingly engage the umbrella pole with the peripheral edge of the aperture 50 on the umbrella pole being in communication with the cylindrical body portion 40 of the locking finger 22. To remove the umbrella, the same actions by the user would be followed. The user would use the side of his foot to depress the locking finger 22 so that the umbrella pole could be drawn upwardly off of support member 10 and through the aperture in the table top of the picnic table.

Figure 6:
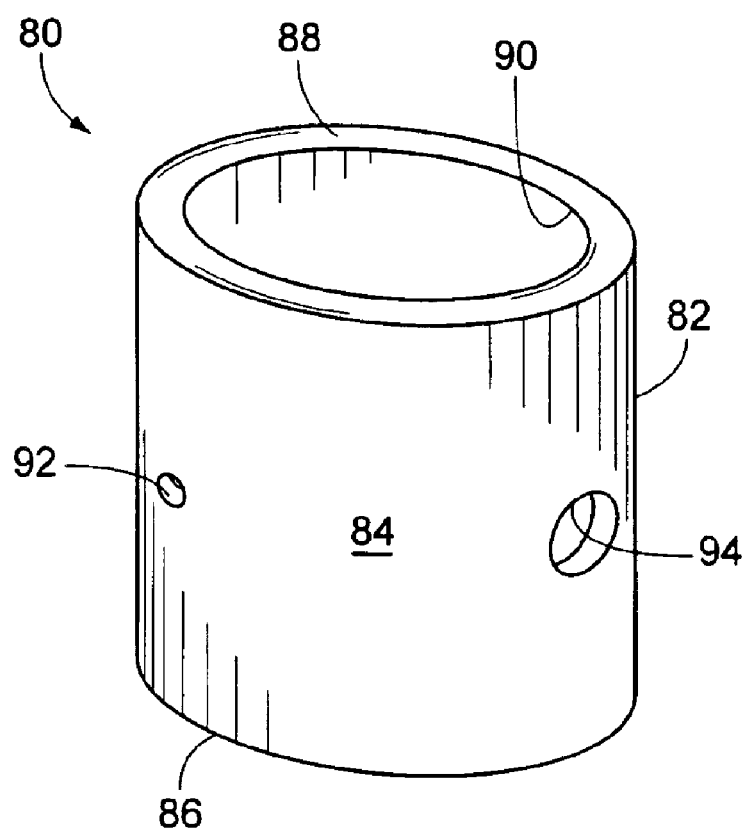
FIG. 6 is a perspective view of a jig which permits modifications of an umbrella pole to fit Applicant's support member.

It will be recognized that original equipment table umbrellas can be constructed with an aperture in their circumferential side wall to accommodate the novel support member as disclosed by the Applicant herein. However, many owners of after market picnic table umbrellas desirous of affording themselves the convenience and use of Applicant's novel support member would be unable to do so unless an aperture 50 were formed in the circumferential side wall 52 of the umbrella pole 54 to receive the locking finger 22. In conjunction with Applicant's novel support member, Applicant has developed a novel jig 80 (FIG. 6) which will allow the owner of an after market umbrella to convert it to use with Applicant's support member 10. Applicant's jig 80 would be a cylindrical member 82 having a circumferential side wall 84 and closed end 86 and open end 88. The diameter of the bore 90 in open end 88 would be slightly larger than the diameter of the after market umbrella pole. Formed in the circumferential side wall 84 of jig 80 would be a first aperture 92 of relatively small diameter in the neighbor of ⅛th of an inch and another aperture 94 of a diameter equal to the diameter of the locking finger 22 on support member 10. The height of these apertures 92 and 94 from closed end 86 of jig 80 would be set such that an aperture 50 could be formed in the umbrella pole 54, which aperture would be coincidental with the locking finger 22 on the support member 10 once the umbrella pole had been slidably received over the support member.

In use, the owner would slip the jig 80 over the lower end of the umbrella pole and utilizing aperture 92 as a guide, would drill a small aperture through the circumferential side wall 52 of the umbrella pole 54. The user would then rotate the jig 80 so that the larger aperture 94 was centered over the drilled aperture formed in the circumferential side wall 52 of the umbrella pole 54. Using a larger drill bit, the user would then insert a larger drill piece into aperture 94 and commence to enlarge the aperture formed in the circumferential side wall 52 of the umbrella pole 54 to conform to the diameter of the locking finger 22. In this manner, an owner of an after market picnic table umbrella can modify the lower end of the umbrella pole to allow it to be utilized with Applicant's novel support member.

While the present invention has been described with respect to the exemplary embodiments thereof, it will be recognized by those of ordinary skill in the art that many modifications or changes can be achieved without departing from the spirit and scope of the invention. Therefore it is manifestly intended that the invention be limited only by the scope of the claims and the equivalence thereof.

I claim:

1. A deck support member in combination with a table umbrella, wherein a tubular support pole of said table umbrella extends downwardly through an aperture in a table in contact with a deck, said deck support member in combination with said table umbrella comprising:

a table umbrella having a tubular support pole extendable through an aperture in a table, a lower end of said tubular pole in contact with a deck;

a deck support member having a cylindrical body member defined by a cylindrical side wall having an outer diameter slightly less than the inner diameter of a tubular support pole for a table umbrella, said cylindrical body member having an open lower end having a peripheral flange thereabout, a closed upper end having an aperture there through for receipt of a securing means, and an aperture in said cylindrical side wall;

a biasing means disposed within said cylindrical body member, the said biasing means of a U-shaped configuration having opposing depending legs and a cross leg, said cross leg having an aperture there through alignable with said aperture in said closed end of said cylindrical body member for receipt of the securing means, one of said opposing depending legs having secured on an outer surface, an extensible finger, said extensible finger having a cylindrical body extending outwardly from said leg of said biasing means and terminating with a radius end, said extensible finger positioned through said aperture in said side wall of said cylindrical body, said extensible finger slidably depressingly engagable with an aperture formed in said lower end of said tubular support pole for said table umbrella.

2. The deck support member in accordance with claim 1 wherein said securing means comprises a fastener means extending through said aperture in said closed end of said cylindrical body member and through said aperture in said cross leg of said biasing means, said securing means engaging an underlying support surface to maintain the deck support member in secure communication therewith.

3. The deck support member in accordance with claim 1 wherein said biasing means is dimensioned such that said downwardly extending legs are juxtaposed against the inner side wall of said cylindrical body member.

4. The deck support member in accordance with claim 1 wherein said extensible finger of said biasing means is depressible within said aperture in said side wall of said cylindrical body member so as to depress the cylindrical body portion of said extensible finger within said cylindrical body member allowing said tubular support pole of said table umbrella to slidably engage over said cylindrical body member, such that a bottom circumferential edge of said tubular support pole is juxtaposed against said flange member of said cylindrical body member of said deck support.

5. The deck support member in accordance with claim 1 wherein said extensible finger member engages said tubular support pole through an aperture in the lower end of said tubular support pole such that said cylindrical body portion of said extensible finger member is juxtaposed against the circumferential periphery of said aperture in said tubular support pole.

6. The deck support member in accordance with claim 1 wherein said tubular support pole and said table umbrella is disengaged from said deck support member by depressing said extensible finger by foot pressure such that said cylindrical portion of said extensible finger is depressed within said cylindrical body member of said deck support member allowing said tubular support pole to disengage from said extensible finger member and slidably disengage from said deck support member in an upward lifting manner.

7. The deck support member in accordance with claim 1 wherein said peripheral flange about said open lower end has formed on an underside thereof, a plurality of deck engaging teeth for prevention of rotation of said deck support member about said securing means.

8. The deck support member in accordance with claim 1 wherein said aperture in said tubular support pole for said table umbrella may be formed utilizing a jig member, said jig member defined by a cylindrical side wall having a first open end and a second closed end, said inner circumference of said cylindrical side wall of said jig member being equal to the outer circumference of said tubular support pole for said table umbrella, said jig member having depth sufficient for the receipt of a portion of said lower end of said tubular support pole for said table umbrella, said cylindrical side walls of said jig member formed with a first aperture and a second aperture, said first aperture being of small diameter and utilized to drill a guide hole through said tubular support pole for said table umbrella, said cylindrical jig member being rotated to align said second aperture of larger diameter to said guide hole so as to drill an aperture through said tubular support pole of a larger diameter, said larger diameter equal to the diameter of said extensible finger of said biasing means, said depth of said bore of said jig member and said height of said first aperture and second aperture of said jig member from said closed bottom end being dimensioned to insure that said aperture drilled in said tubular support pole for said table umbrella is of correct height to engage said extensible finger of said deck support member.

\* \* \* \* \*